United States Patent
Kato et al.

(10) Patent No.: US 11,865,492 B2
(45) Date of Patent: Jan. 9, 2024

(54) ACID GAS REMOVAL CONTROL APPARATUS, ACID GAS REMOVAL CONTROL METHOD, AND ACID GAS REMOVING APPARATUS

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yasuhiro Kato, Kawasaki Kanagawa (JP); Mitsuru Udatsu, Kawasaki Kanagawa (JP); Daigo Muraoka, Kawasaki Kanagawa (JP); Hayato Morigaki, Yokohama Kanagawa (JP); Shinji Murai, Sagamihara Kanagawa (JP); Koshito Fujita, Yokohama Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 234 days.

(21) Appl. No.: 17/468,941

(22) Filed: Sep. 8, 2021

(65) Prior Publication Data
US 2022/0080347 A1 Mar. 17, 2022

(30) Foreign Application Priority Data
Sep. 11, 2020 (JP) .................................. 2020-153278

(51) Int. Cl.
*B01D 53/14* (2006.01)
*B01D 53/77* (2006.01)

(52) U.S. Cl.
CPC ..... *B01D 53/1406* (2013.01); *B01D 53/1425* (2013.01); *B01D 53/1468* (2013.01);
(Continued)

(58) Field of Classification Search
CPC ............... B01D 53/14; B01D 53/1406; B01D 53/1412; B01D 53/1425; B01D 53/1456;
(Continued)

(56) References Cited

U.S. PATENT DOCUMENTS

| 4,491,566 A | 1/1985 | Adams et al. |
| 9,901,870 B2 | 2/2018 | Udatsu et al. |

(Continued)

FOREIGN PATENT DOCUMENTS

| EP | 3 646 936 A1 | 5/2020 |
| EP | 3 646 937 A1 | 5/2020 |

(Continued)

*Primary Examiner* — Sharon Pregler
(74) *Attorney, Agent, or Firm* — Foley & Lardner LLP

(57) ABSTRACT

In one embodiment, an acid gas removing apparatus includes an absorber configured to bring a first gas including an acid gas and a lean solution into contact to discharge a rich solution that is the lean solution having absorbed the acid gas, a regenerator configured to separate the acid gas from the rich solution discharged by the absorber to discharge the lean solution that is the rich solution separated from the acid gas, and a measuring instrument configured to measure a temperature of the rich or lean solution in the regenerator. Furthermore, an acid gas removal control apparatus that controls the acid gas removing apparatus includes a receiver configured to receive the measured temperature, and a controller configured to control resupply of a resupplied solution to the rich or lean solution or removal of an acid component from the rich or lean solution, based on the received temperature.

14 Claims, 3 Drawing Sheets

(52) U.S. Cl.
CPC ......... *B01D 53/1475* (2013.01); *B01D 53/77* (2013.01); *B01D 2251/206* (2013.01); *B01D 2257/304* (2013.01); *B01D 2257/504* (2013.01)

(58) Field of Classification Search
CPC . B01D 53/1468; B01D 53/1475; B01D 53/77
See application file for complete search history.

(56) References Cited

U.S. PATENT DOCUMENTS

| | | | |
|---|---|---|---|
| 10,786,781 B2* | 9/2020 | Nagano | ................ B01D 53/346 |
| 11,014,046 B2 | 5/2021 | Kato et al. | |
| 2010/0108610 A1 | 5/2010 | Godhwani et al. | |
| 2015/0290576 A1 | 10/2015 | Kiguchi et al. | |
| 2016/0158688 A1 | 6/2016 | Udatsu et al. | |
| 2019/0232215 A1 | 8/2019 | Fujita et al. | |
| 2020/0114304 A1 | 4/2020 | Miyamoto et al. | |

FOREIGN PATENT DOCUMENTS

| | | |
|---|---|---|
| JP | H06-154554 A | 6/1994 |
| JP | H08-89756 A | 4/1996 |
| JP | 2013-128899 A | 7/2013 |
| JP | 2015-104693 A | 6/2015 |
| JP | 2017-113665 A | 6/2017 |
| JP | 2019-111512 A | 7/2019 |
| KR | 101443100 B1 | 9/2014 |
| WO | WO-2014/077373 A1 | 5/2014 |

* cited by examiner

ACID GAS REMOVAL CONTROL APPARATUS, ACID GAS REMOVAL CONTROL METHOD, AND ACID GAS REMOVING APPARATUS

CROSS REFERENCE TO RELATED APPLICATION

This application is based upon and claims the benefit of priority from the prior Japanese Patent Application No. 2020-153278, filed on Sep. 11, 2020, the entire contents of which are incorporated herein by reference.

FIELD

Embodiments described herein relate to an acid gas removal control apparatus, an acid gas removal control method, and an acid gas removing apparatus.

BACKGROUND

In thermal power plants or ironworks, various gases are used and discharged. Examples of such gases include combustion flue gas generated by burning fossil fuel, coal gasified gas produced by gasifying coal, and natural gas to be used as fuel. These gases contain acid gas components such as $CO_2$ (carbon dioxide), $SO_x$ (sulfur oxide), $NO_x$ (nitrogen oxide), and $H_2S$ (hydrogen sulfide), for example.

In order to prevent such an acid gas component from being emitted into the atmosphere, a method of causing the acid gas component to be absorbed into an absorbent (absorbing liquid) to remove the acid gas component is being studied enthusiastically. An example of such an absorbent is an aqueous solution containing an amino-group containing compound (amine-based compound). By subjecting treatment-target gas containing an acid gas component and an absorbent to gas-liquid contact, the acid gas component in the treatment-target gas can be absorbed into the absorbent to remove the acid gas component from the treatment-target gas.

For example, a $CO_2$ recovery apparatus is known which includes an absorption tower that brings flue gas and an absorbent into contact to cause $CO_2$ in the flue gas to be absorbed into the absorbent and a regeneration tower that heats the absorbent having absorbed $CO_2$ to cause $CO_2$ to be emitted from the absorbent. The absorbent regenerated by emitting $CO_2$ is supplied again from the regeneration tower to the absorption tower, and reused in the absorption tower. In this apparatus, the absorbent is used in a circulating manner between the absorption tower and the regeneration tower.

However, an absorbent component such as an amine component may decompose under the influence of heat, influence of oxygen, or the like, or may be released together with gas discharged from an outlet of the absorption tower. When such decomposition or release occurs, the absorbent component gradually disappears from the absorbent. When the absorbent component in the absorbent decreases, acid gas recovery performance of the absorbent degrades. This requires periodic resupply of the absorbent component or replacement of the absorbent.

Moreover, when the amine component in the absorbent reacts with carbonyl sulfide, hydrogen cyanide, thiocyanic acid, thiosulfuric acid, or another inorganic acid, a deteriorated object called heat stable amine salt (HSAS) is generated. The heat stable amine salt is also generated when an amine component decomposes under the influence of heat, influence of oxygen, or the like. These heat stable amine salts are accumulated in the absorbent because of not being decomposed by heat supplied when regenerating the absorbent in the regeneration tower and not being separated from the absorbent. Accumulation of the heat stable amine salts in the absorbent degrades acid gas recovery performance of the absorbent.

DETAILED DESCRIPTION

Figure 1:
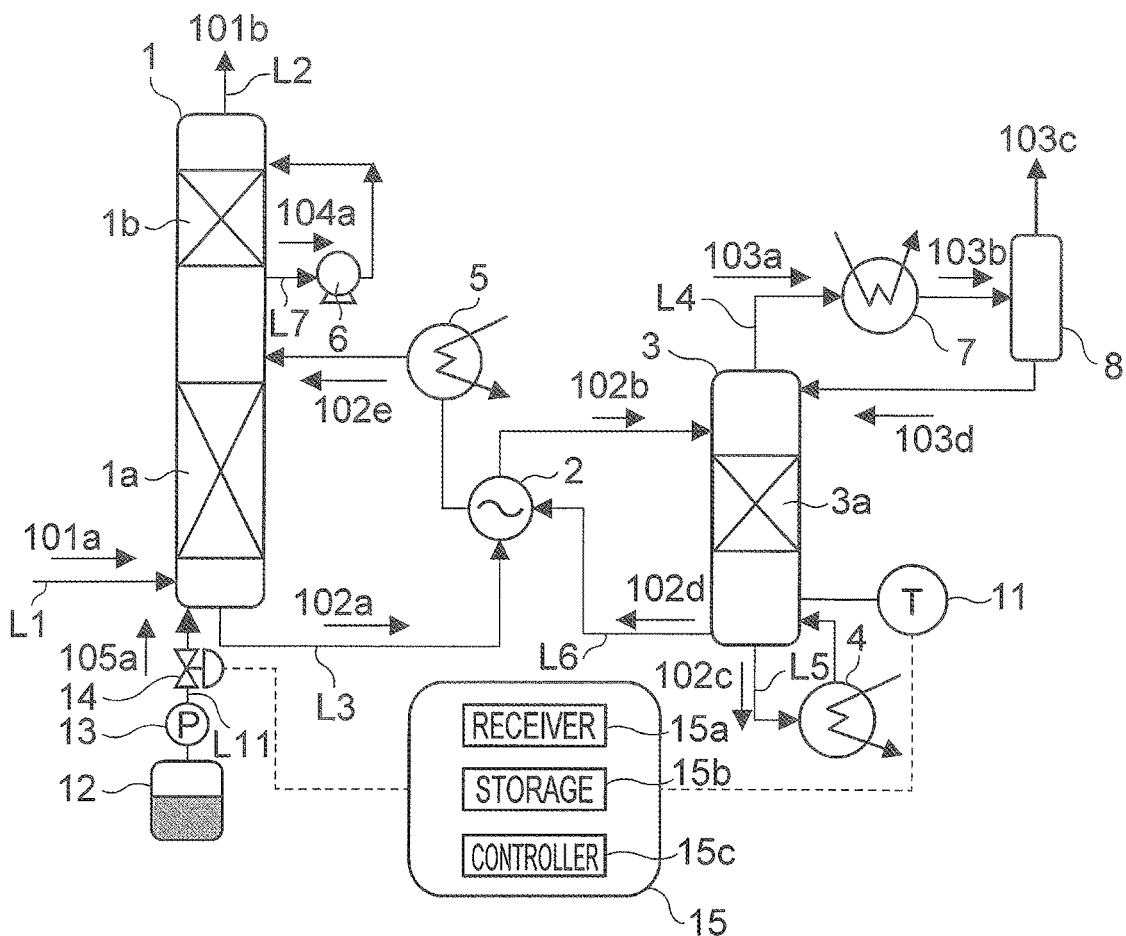
FIG. 1 is a schematic view showing a configuration of an acid gas removing apparatus of a first embodiment.

In an acid gas removing apparatus such as a $CO_2$ recovery apparatus, an amine content and an amount of acid accumulated (amount of acid component accumulated) in an absorbent need to be periodically analyzed in order to maintain acid gas absorbing performance of the absorbent by resupplying an amine component and removing an acid component. However, the periodic analysis of the amine content and amount of acid accumulated in the absorbent imposes a great burden on an operation of the acid gas removing apparatus.

Moreover, the above-described regeneration tower heats the absorbent by vapor to cause $CO_2$ to be emitted from the absorbent. On the other hand, when the amine component in the absorbent decreases, or acid accumulates in the absorbent, the absorbent in the regeneration tower is typically raised in temperature while maintaining a predetermined $CO_2$ recovered amount. As the absorbent has a higher temperature, the amine component is more likely to be decomposed. This makes it preferable to maintain the absorbent in the regeneration tower at the lowest possible temperature.

Embodiments will now be explained with reference to the accompanying drawings. In FIGS. 1 to 5, the same components are denoted by the same reference numerals, and repeated description will be omitted.

In one embodiment, an acid gas removing apparatus includes an absorber configured to bring a first gas including an acid gas and a lean solution into contact to discharge a rich solution that is the lean solution having absorbed the acid gas, and a second gas including the first gas from which the acid gas has been removed, a regenerator configured to separate the acid gas from the rich solution discharged by the absorber to discharge the lean solution that is the rich solution separated from the acid gas, and a third gas including the acid gas separated from the rich solution, and a measuring instrument configured to measure a temperature of the rich solution or the lean solution in the regenerator. Furthermore, an acid gas removal control apparatus that controls the acid gas removing apparatus includes a receiver configured to receive the temperature measured by the measuring instrument, and a controller configured to control resupply of a resupplied solution to the rich solution or the lean solution or removal of an acid component from the rich solution or the lean solution, based on the temperature received by the receiver.

First Embodiment

FIG. 1 is a schematic view showing a configuration of an acid gas removing apparatus of a first embodiment. The acid gas removing apparatus in FIG. 1 is a $CO_2$ recovery apparatus that recovers $CO_2$ in treatment-target gas, for example.

The acid gas removing apparatus in FIG. 1 includes an absorption tower 1, a heat exchanger 2, a regeneration tower 3, a reboiler 4, a cooler 5, a circulating pump 6, a cooler 7, a gas-liquid separator 8, a thermometer 11, a resupplied solution tank 12, a resupplied solution pump 13, a valve 14, and a control apparatus 15. The absorption tower 1 includes a gas-liquid contact portion 1a and a gas washing portion 1b. The regeneration tower 3 includes a gas-liquid contact portion 3a. The control apparatus 15 includes a receiver 15a, a storage 15b, and a controller 15c. The absorption tower 1 is an example of an absorber, and the regeneration tower 3 is an example of a regenerator. The thermometer 11 is an example of a measuring instrument, and the control apparatus 15 is an example of an acid gas removal control apparatus. The resupplied solution tank 12, the resupplied solution pump 13, and the valve 14 are examples of a resupplier, and the valve 14 is an example of a first valve.

The treatment-target gas in the present embodiment is a flue gas 101a containing $CO_2$, and $CO_2$ in the flue gas 101a is absorbed into the absorbent in the acid gas removing apparatus. A flue gas 101b which is the flue gas 101a from which $CO_2$ has been removed is discharged to the outside of the acid gas removing apparatus. The flue gas 101a is an example of a first gas, and the flue gas 101b is an example of a second gas.

An absorbent having a high $CO_2$ concentration is called a rich solution, and an absorbent having a low $CO_2$ concentration is called a lean solution. The lean solution turns into the rich solution by absorbing $CO_2$. The rich solution turns into the lean solution by emitting $CO_2$.

In the present embodiment, the absorbent circulates among the absorption tower 1, the heat exchanger 2, the regeneration tower 3, the reboiler 4, and the cooler 5. The absorbent turns into the rich solution from the lean solution, or turns into the lean solution from the rich solution while circulating in this manner. FIG. 1 shows a rich solution 102a flowing from the absorption tower 1 to the heat exchanger 2, a rich solution 102b flowing from the heat exchanger 2 to the regeneration tower 3, a lean solution 102c flowing between the regeneration tower 3 and the reboiler 4, a lean solution 102d flowing from the regeneration tower 3 to the heat exchanger 2, and a lean solution 102e flowing from the heat exchanger 2 to the absorption tower 1 via the cooler 5.

The absorbent in the present embodiment is an amine-based aqueous solution containing an amine-based compound (amino-group containing compound) and water. Examples of the amine-based compound include primary amines such as monoethanolamine and 2-amino-2-methyl-1-propanol, secondary amines such as diethanolamine and 2-methylaminoethanol, tertiary amines such as triethanolamine and n-methyldiethanolamine, polyamines such as ethylenediamine, triethylenediamine, diethylenetriamine, and xylylenediamine, cyclic amines such as piperazines, piperidines, and pyrrolidines, and amino acids such as methylaminocarboxylic acid. The absorbent may contain only one of these amine-based compounds, or may contain two or more of these amine-based compounds. The absorbent in the present embodiment is an aqueous solution containing 10 to 70 wt % of an amine-based compound, for example.

The absorbent in the present embodiment may contain another substance together with the amine-based compound and water. Examples of such a substance include a reaction accelerator for accelerating a chemical reaction, a nitrogen-containing compound for improving $CO_2$ absorbing performance, a corrosion inhibitor for inhibiting corrosion of a plant facility, an antifoaming agent for inhibiting foaming of the absorbent, an antioxidant for inhibiting deterioration of the absorbent, and a pH adjuster for adjusting pH of the absorbent. The absorbent may contain such a substance in a range in which the effects of the absorbent are not impaired.

Examples of the flue gas 101a include combustion flue gas discharged from boilers and gas turbines in thermal power plants, and treated flue gas generated in ironworks. The flue gas 101a is raised in pressure by a blower, for example, cooled in a cooling tower, and then introduced into the absorption tower 1 via a flue gas line L1 (for example, an airflue). The flue gas line L1 introduces the flue gas 101a into a space under the gas-liquid contact portion 1a in the absorption tower 1.

The absorption tower 1 captures the flue gas 101a into the space under the gas-liquid contact portion 1a in the absorption tower 1, and captures the lean solution 102e into a space between the gas-liquid contact portion 1a and the gas washing portion 1b in the absorption tower 1. The gas-liquid contact portion 1a brings the flue gas 101a and the lean solution 102e into contact to cause the lean solution 102e to absorb $CO_2$ in the flue gas 101a.

The flue gas 101a from which $CO_2$ has been removed is supplied to the gas washing portion 1b. The gas washing portion 1b cleans (washes) the flue gas 101a, and recovers amine entrained by the flue gas 101a. The cleaned flue gas 101a is discharged as the flue gas 101b which is treated gas from the absorption tower 1 to an absorption tower outlet line L2, and discharged from the absorption tower outlet line L2 to the outside of the acid gas removing apparatus. On the other hand, the lean solution 102e having absorbed $CO_2$ is discharged as the rich solution 102a from the absorption tower 1 to a rich solution line L3.

The gas-liquid contact portion 1a in the present embodiment is formed of a filling material. This increases the gas-liquid contact efficiency of the flue gas 101a and the lean solution 102e. A liquid disperser is provided above the gas-liquid contact portion 1a. The liquid disperser drops the lean solution 102e captured into the absorption tower 1 to the gas-liquid contact portion 1a in a dispersed manner. On the other hand, the flue gas 101a captured into the absorption tower 1 moves up from the bottom to the top of the absorption tower 1. When the flue gas 101a moving up in the absorption tower 1 comes into contact with the lean solution 102e in the gas-liquid contact portion 1a by counterflow contact, a reaction such as in formula (1) or formula (2), for example, occurs, and thermally decomposable salt ($R_3NH_2CO_3$) or heat stable amine salt ($R_3NHX$) is formed:

$$R_3N + CO_2 + H_2O \rightarrow R_3NH_2CO_3 \quad (1)$$

$$R_3N + HX \rightarrow R_3NHX \quad (2)$$

By the reaction in formula (1), $CO_2$ in the flue gas 101a is absorbed into the lean solution 102e, and $CO_2$ is removed from the flue gas 101a. The lean solution 102e having absorbed $CO_2$ is retained as the rich solution 102a at the bottom of the absorption tower 1. The rich solution 102a contains a thermally decomposable salt and a heat stable amine salt. The rich solution 102a may further contain an organic acid generated by a reaction with oxygen contained in the flue gas 101a. The rich solution 102a may further contain a heat stable amine salt generated by absorbing $SO_x$, $NO_x$, carbonyl sulfide, hydrogen cyanide, thiocyanic acid, thiosulfuric acid, or another inorganic acid contained in the flue gas 101a.

The flue gas 101a passed through the gas-liquid contact portion 1a further moves up in the absorption tower 1 to be supplied to the gas washing portion 1b. Further details of the gas washing portion 1b will be described later.

The rich solution 102a retained at the bottom of the absorption tower 1 is discharged from the absorption tower 1 to the rich solution line L3. The rich solution 102a is raised in pressure by a pump not shown on the rich solution line L3, and introduced into the heat exchanger 2 on the rich solution line L3. The heat exchanger 2 exchanges heat between the rich solution 102a and the lean solution 102d to heat the rich solution 102a. The heat exchanger 2 is a plate heat exchanger or shell and tube heat exchanger, for example. The heated rich solution 102a is introduced into the regeneration tower 3 as the rich solution 102b via the rich solution line L3.

The regeneration tower 3 captures the rich solution 102b into a space above the gas-liquid contact portion 3a in the regeneration tower 3, and captures gas from the reboiler 4 into a space under the gas-liquid contact portion 3a in the regeneration tower 3. The gas-liquid contact portion 3a brings the gas from the reboiler 4 and the rich solution 102b into contact to heat the rich solution 102b with the gas from the reboiler 4. As a result, $CO_2$ is emitted from the rich solution 102b, so that $CO_2$ is separated from the rich solution 102b. The rich solution 102b may emit $CO_2$ as a whole in the rich solution 102b, or may emit only part of $CO_2$ in the rich solution 102b.

$CO_2$ separated from the rich solution 102b is discharged as a regeneration tower outlet gas 103a from the regeneration tower 3 to a regeneration tower outlet line L4 together with other gases. The regeneration tower outlet gas 103a is an example of a third gas. On the other hand, the rich solution 102b separated from $CO_2$ is discharged as the lean solution 102c from the regeneration tower 3 to a lean solution line L5, or discharged as the lean solution 102d from the regeneration tower 3 to a lean solution line L6. In this manner, the rich solution 102b is regenerated in the regeneration tower 3 as the lean solutions 102c and 102d.

The lean solution 102c discharged to the lean solution line L5 is introduced into the reboiler 4 on the lean solution line L5. The reboiler 4 exchanges heat between the lean solution 102c and vapor to heat the lean solution 102c. As a result, $CO_2$ and water vapor are generated from the lean solution 102c. The heated lean solution 102c is returned to the bottom of the regeneration tower 3 via the lean solution line L5 together with the generated $CO_2$ and water vapor.

The gas-liquid contact portion 3a in the present embodiment is formed of a filling material similarly to the above-described gas-liquid contact portion 1a. A liquid disperser is provided above the gas-liquid contact portion 3a. The liquid disperser drops the rich solution 102b captured into the regeneration tower 3 to the gas-liquid contact portion 3a in a dispersed manner. On the other hand, the gas from the reboiler 4, that is, $CO_2$ and water vapor returned from the reboiler 4 move up from the bottom to the top of the regeneration tower 3. When the gas moving up in the regeneration tower 3 comes into contact with the rich solution 102b in the gas-liquid contact portion 3a by counterflow contact, the rich solution 102b is heated by the gas. As a result, $CO_2$ is desorbed from the rich solution 102b, and water vapor is evaporated from the rich solution 102b.

The rich solution 102b having emitted $CO_2$ is retained as the lean solutions 102c and 102d at the bottom of the regeneration tower 3. On the other hand, $CO_2$ and water vapor generated from the rich solution 102b move up further in the regeneration tower 3, and are then discharged as the regeneration tower outlet gas 103a from the regeneration tower 3 to the regeneration tower outlet line L4. Further details of the regeneration tower outlet line L4 will be described later.

The lean solution 102d discharged to the lean solution line L6 is raised in pressure by a pump not shown on the lean solution line L6, and introduced into the heat exchanger 2 on the lean solution line L6. The heat exchanger 2 exchanges heat between the lean solution 102d and the rich solution 102a to cool the lean solution 102d. The cooled lean solution 102d is introduced as the lean solution 102e into the absorption tower 1 via the lean solution line L6. The lean solution 102e is cooled further by the cooler 5 on the lean solution line L6 before being introduced into the absorption tower 1.

Next, further details of the gas washing portion 1b will be described.

The gas washing portion 1b in the present embodiment cleans the flue gas 101a with a cleaning liquid 104a, and recovers amine entrained by the flue gas 101a into the cleaning liquid 104a. The gas washing portion 1b is located downstream of the gas-liquid contact portion 1a, and located upstream of the gas-liquid contact portion 1a in a direction in which the flue gas 101a flows. The gas washing portion 1b may be a gas cleaning tower provided outside the absorption tower 1.

A liquid disperser is provided above the gas washing portion 1b. The liquid disperser drops the cleaning liquid 104a to the gas washing portion 1b in a dispersed manner. On the other hand, the flue gas 101a moves up from the bottom to the top of the absorption tower 1. The flue gas 101a moving up in the absorption tower 1 comes into contact with the cleaning liquid 104a in the gas washing portion 1b to be cleaned with the cleaning liquid 104a. The cleaned flue gas 101a moves up further in the absorption tower 1, and is then discharged as the flue gas 101b which is treated gas to the outside of the acid gas removing apparatus.

On the other hand, the cleaning liquid 104a having recovered amine is retained in a cleaning liquid retainer not shown but provided below the gas washing portion 1b. The cleaning liquid retainer is coupled to a cleaning liquid line L7. The cleaning liquid 104a retained in the cleaning liquid retainer is delivered by the circulating pump 6 on the cleaning liquid line L7 to be supplied again to the liquid disperser above the gas washing portion 1b. In this manner, the cleaning liquid 104a is used in a circulating manner between the gas washing portion 1b and the cleaning liquid line L7.

The cleaning liquid 104a is pure water or sulfuric acid water, for example. In general, as the cleaning liquid 104a has lower pH, the cleaning liquid 104a has higher cleaning efficiency.

When the cleaning liquid 104a is continuously used, the amine concentration in the cleaning liquid 104a increases, and the amine recovery performance of the cleaning liquid 104a degrades. For this reason, in the present embodiment, part of the cleaning liquid 104a circulating between the gas washing portion 1b and the cleaning liquid line L7 may be discharged to the outside of the acid gas removing apparatus, or may be mixed into the absorbent in the acid gas removing apparatus. In this case, a new cleaning liquid may be resupplied to the cleaning liquid line L7.

Next, further details of the regeneration tower outlet line L4 will be described.

The regeneration tower outlet gas 103a discharged to the regeneration tower outlet line L4 contains $CO_2$ gas and water vapor. The acid gas removing apparatus in the present embodiment includes the cooler 7 and the gas-liquid separator 8 for treating the regeneration tower outlet gas 103a on the regeneration tower outlet line L4.

The cooler 7 cools the regeneration tower outlet gas 103a to condense water vapor in the regeneration tower outlet gas 103a into liquid water (condensate). The cooler 7 discharges a gas-liquid two-phase flow 103b containing the $CO_2$ gas and condensate described above to the gas-liquid separator 8.

The gas-liquid separator 8 separates the gas-liquid two-phase flow 103b into a $CO_2$ gas 103c and a condensate 103d. The $CO_2$ gas 103c is discharged from the gas-liquid separator 8 to the outside of the acid gas removing apparatus. The acid gas removing apparatus in the present embodiment can recover the $CO_2$ gas 103c from the flue gas 101a in this manner. On the other hand, the condensate 103d is returned to the inside of the regeneration tower 3 from the gas-liquid separator 8 via the regeneration tower outlet line L4.

Next, details of the thermometer 11, the resupplied solution tank 12, the resupplied solution pump 13, the valve 14, and the control apparatus 15 will be described.

The thermometer 11 measures a temperature of the absorbent in the regeneration tower 3, and outputs a signal including a measurement result of this temperature to the control apparatus 15. This absorbent may be the rich solution in the regeneration tower 3, or may be the lean solution in the regeneration tower 3, for example. The thermometer 11 in the present embodiment measures a regeneration tower bottom temperature, that is, a temperature of the lean solution retained at the bottom (a still part) of the regeneration tower 3. This lean solution is discharged as the lean solution 102c or the lean solution 102d from the regeneration tower 3.

The resupplied solution tank 12 retains the resupplied solution 105a to be resupplied to the absorbent in the acid gas removing apparatus. The resupplied solution 105a may be a new absorbent, for example. The resupplied solution tank 12 may supply the resupplied solution 105a to the rich solution, or may supply the resupplied solution 105a to the lean solution. In the present embodiment, the resupply tank 12 and the absorption tower 1 are coupled with the resupplied solution line L11, and the resupplied solution 105a in the resupply tank 12 is supplied to the absorption tower 1 via the resupplied solution line L11. The resupplied solution line L11 introduces the resupplied solution 105a into the space under the gas-liquid contact portion 1a in the absorption tower 1 to resupply the resupplied solution 105a to the rich solution 102a at the bottom of the absorption tower 1. The resupplied solution line L11 is an example of a first flow path.

The resupplied solution pump 13 and the valve 14 are provided on the resupplied solution line L11. The resupplied solution pump 13 delivers the resupplied solution 105a in the resupplied solution tank 12 to the absorption tower 1. The valve 14 is used to control delivery of the resupplied solution 105a from the resupplied solution tank 12 to the absorption tower 1. For example, in a case of starting resupply of the resupplied solution 105a, the valve 14 is opened, and in a case of stopping resupply of the resupplied solution 105a, the valve 14 is closed.

The control apparatus 15 controls various operations of the acid gas removing apparatus. Examples of the control apparatus 15 include a processor, an electric circuit, and a PC (Personal Computer). The control apparatus 15 monitors a signal from the thermometer 11, and controls opening/closing and an opening degree of the valve 14, for example.

The receiver 15a receives, from the thermometer 11, a signal including a measurement result of the temperature of the absorbent in the regeneration tower 3. The receiver 15a in the present embodiment receives data on the regeneration tower bottom temperature measured by the thermometer 11, for example.

The storage 15b is used to store various types of data for controlling the operations of the acid gas removing apparatus. The storage 15b in the present embodiment stores set temperatures Ta1 and Ta2 which will be described later, for example (see FIG. 2).

The controller 15c controls resupply of the resupplied solution 105a to the absorbent in the acid gas removing apparatus based on the temperature received by the receiver 15a. For example, when resupplying the resupplied solution 105a to the absorbent in the acid gas removing apparatus, the controller 15c opens the valve 14 on the resupplied solution line L11. This allows the resupplied solution 105a to be introduced into the absorption tower 1 from the resupplied solution tank 12 via the resupplied solution line L11, and the resupplied solution 105a is resupplied to the rich solution 102a at the bottom of the absorption tower 1.

Figure 2:
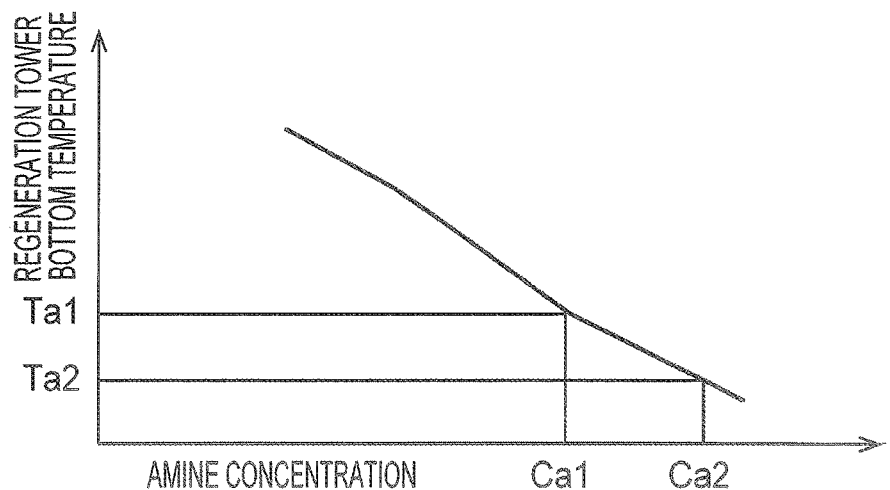
FIG. 2 is a graph showing a relation between amine concentration and regeneration tower bottom temperature of the first embodiment.

FIG. 2 is a graph showing a relation between amine concentration and regeneration tower bottom temperature in the first embodiment.

In the graph in FIG. 2, the horizontal axis indicates an amine concentration in the lean solution retained at the bottom of the regeneration tower 3, and the vertical axis indicates the temperature (regeneration tower bottom temperature) of the lean solution retained at the bottom of the regeneration tower 3. FIG. 2 shows a relation between the amine concentration and the regeneration tower bottom temperature in a case where the flow amount of vapor to be used for heat exchange in the reboiler 4 is constant. As shown in FIG. 2, when the amine concentration in the lean solution decreases, the regeneration tower bottom temperature rises.

Since the $CO_2$ recovery performance of the absorbent degrades when the amine component in the absorbent decreases as described above, the amine component is desirably resupplied to the absorbent. However, if the amine content in the absorbent shall be periodically analyzed in order to sense that the amine component in the absorbent has decreased, a large burden will be imposed on the operation of the acid gas removing apparatus.

The acid gas removing apparatus in the present embodiment resupplies the amine component to the absorbent utilizing the relation shown in FIG. 2. For example, in a case where the regeneration tower bottom temperature is high, the controller 15c determines that the amine concentration in the absorbent is low, and resupplies the resupplied solution 105a to the absorbent. On the other hand, in a case where the regeneration tower bottom temperature is low, the controller 15c determines that the amine concentration in the absorbent is high, and does not resupply the resupplied solution 105a to the absorbent. The present embodiment makes it possible to determine a time at which the resupplied solution 105a is to be resupplied to the absorbent by measuring the temperature of the absorbent instead of analyzing the amine content in the absorbent.

In the present embodiment, in order to exert such control, the set temperatures Ta1 and Ta2 shown in FIG. 2 are used. The set temperature Ta1 is a regeneration tower bottom temperature in a case where the amine concentration is Ca1, and the set temperature Ta2 is the regeneration tower bottom temperature in a case where the amine concentration is Ca2. The set temperature Ta1 is used as a threshold value for starting resupply of the resupplied solution 105a. The set temperature Ta2 is used as a threshold value for terminating resupply of the resupplied solution 105a. In the present embodiment, the set temperature Ta2 is lower than the set temperature Ta1 (Ta2<Ta1), and the amine concentration Ca2 is higher than the amine concentration Ca1 (Ca2>Ca1). The set temperature Ta1 is an example of a first set temperature. The set temperature Ta2 is an example of a second set temperature.

Next, an operation of the acid gas removing apparatus in the present embodiment will be described with reference to FIG. 1 again.

The controller 15c opens the valve 14 in a case where a temperature (received temperature) received by the receiver 15a rises to the set temperature Ta1. This allows resupply of the resupplied solution 105a to be started, and the amine concentration in the absorbent in the acid gas removing apparatus increases.

The control apparatus 15c keeps the valve 14 open while the received temperature is higher than the set temperature Ta1 to continue resupply of the resupplied solution 105a. On the other hand, the control apparatus 15c do not close the valve 14 even if the received temperature drops to the set temperature Ta1. If the received temperature drops to the set temperature Ta2, the control apparatus 15c closes the valve 14. This allows resupply of the resupplied solution 105a to be terminated.

The present embodiment makes it possible to prevent opening/closing of the valve 14 from being repeated in a short period in a case where the received temperature oscillates around the set temperature Ta1 by setting the set temperature Ta2 (the threshold value for terminating resupply) to be lower than the set temperature Ta1 (the threshold value for starting resupply). The set temperatures Ta1 and Ta2 are 100° C. to 150° C., for example. Moreover, the difference (Ta1−Ta2) between the set temperature Ta1 and the set temperature Ta2 is 5° C. to 50° C., for example.

The control apparatus 15c keeps the valve 14 closed while the received temperature is lower than the set temperature Ta2 to keep stopping resupply of the resupplied solution 105a. On the other hand, the control apparatus 15c does not open the valve 14 even if the received temperature rises to the set temperature Ta2. The control apparatus 15c opens the valve 14 again if the received temperature rises to the set temperature Ta1. This allows resupply of the resupplied solution 105a to be started again, and the amine concentration in the absorbent in the acid gas removing apparatus increases. In the present embodiment, start and termination of resupply of the resupplied solution 105a are repeated alternately.

Next, various variations of the operation of the acid gas removing apparatus in the present embodiment will be described.

The present embodiment also makes it possible to control resupply of the resupplied solution 105a based on a necessary flow amount of vapor to be used for heat exchange in the reboiler 4 instead of being based on the regeneration tower bottom temperature. In this case, the thermometer 11 is replaced by a flow meter. However, the temperature of the absorbent is easier to manage than the flow amount of vapor by preventing the temperature of the absorbent from becoming high. This makes it more desirable to control resupply of the resupplied solution 105a based on the regeneration tower bottom temperature.

In the present embodiment, the set temperature Ta1 may be used as a threshold value for both start of resupply and termination of resupply. For example, in a case where the received temperature is unlikely to oscillate around the set temperature Ta1, only the set temperature Ta1 may be used as a threshold value. On the other hand, in a case where the received temperature is highly likely to oscillate around the set temperature Ta1, both the set temperatures Ta1 and Ta2 are desirably used as threshold values.

The resupplied solution 105a may be resupplied to an absorbent other than the rich solution 102a at the bottom of the absorption tower 1. The resupplied solution 105a may be resupplied to the rich solution 102a, 102b or the lean solution 102c, 102d, 102e in the absorption tower 1, in the regeneration tower 3, on the rich solution line L3, on the lean solution line L5, or on the lean solution line L6, for example.

Moreover, when resupplying the resupplied solution 105a to the absorbent, the amount and time of resupply of the resupplied solution 105a can be set freely. For example, in a case where the received temperature rises to the set temperature Ta1, and resupply of the resupplied solution 105a is started, the controller 15c may terminate resupply of the resupplied solution 105a if a predetermined time elapses after resupply of the resupplied solution 105a is started or if a predetermined amount of resupply is resupplied, instead of terminating resupply of the resupplied solution 105a if the received temperature drops to the set temperature Ta2. After resupply is completed, a predetermined waiting time may be set. By measuring if the regeneration tower bottom temperature after the lapse of the predetermined waiting time has reached the set temperature Ta2, and performing further resupply, an influence caused by a sudden variation in the regeneration tower bottom temperature associated with the resupply can be reduced.

Moreover, the controller 15c may control resupply of the resupplied solution 105a based on an instantaneous value of the regeneration tower bottom temperature, or may control resupply of the resupplied solution 105a based on an average value of the regeneration tower bottom temperature. The former case makes it possible to reflect an instantaneous change in the regeneration tower bottom temperature in the resupply of the resupplied solution 105a. The latter case makes it possible to ignore a change in the regeneration tower bottom temperature in a short time as an error. Since the regeneration tower bottom temperature may vary under the influence of a variation in the $CO_2$ concentration in the flue gas 101a, it is preferable to use the average value in a case where the variation ranges widely. The above-described average value can be set freely, but is an average value of the regeneration tower bottom temperature per hour to per day, for example.

Moreover, the set temperatures Ta1 and Ta2 can be set freely. The set temperature Ta1 is desirably set to be lower than a saturation temperature of water at a full pressure in the regeneration tower 3, for example. This makes it possible to start resupply of the resupplied solution 105a before the absorbent reaches the saturation temperature, which can prevent the temperature of the absorbent from becoming high.

As described above, the controller 15c in the present embodiment controls resupply of the resupplied solution 105a to the absorbent based on the temperature of the absorbent measured by the thermometer 11. This makes it possible to suitably perform resupply of the resupplied solution 105a to the absorbent in the present embodiment. A time at which the resupplied solution 105a is to be resupplied to the absorbent can be determined by measuring the temperature of the absorbent instead of analyzing the content of an absorbent component in the absorbent, for example.

Second Embodiment

Figure 3:
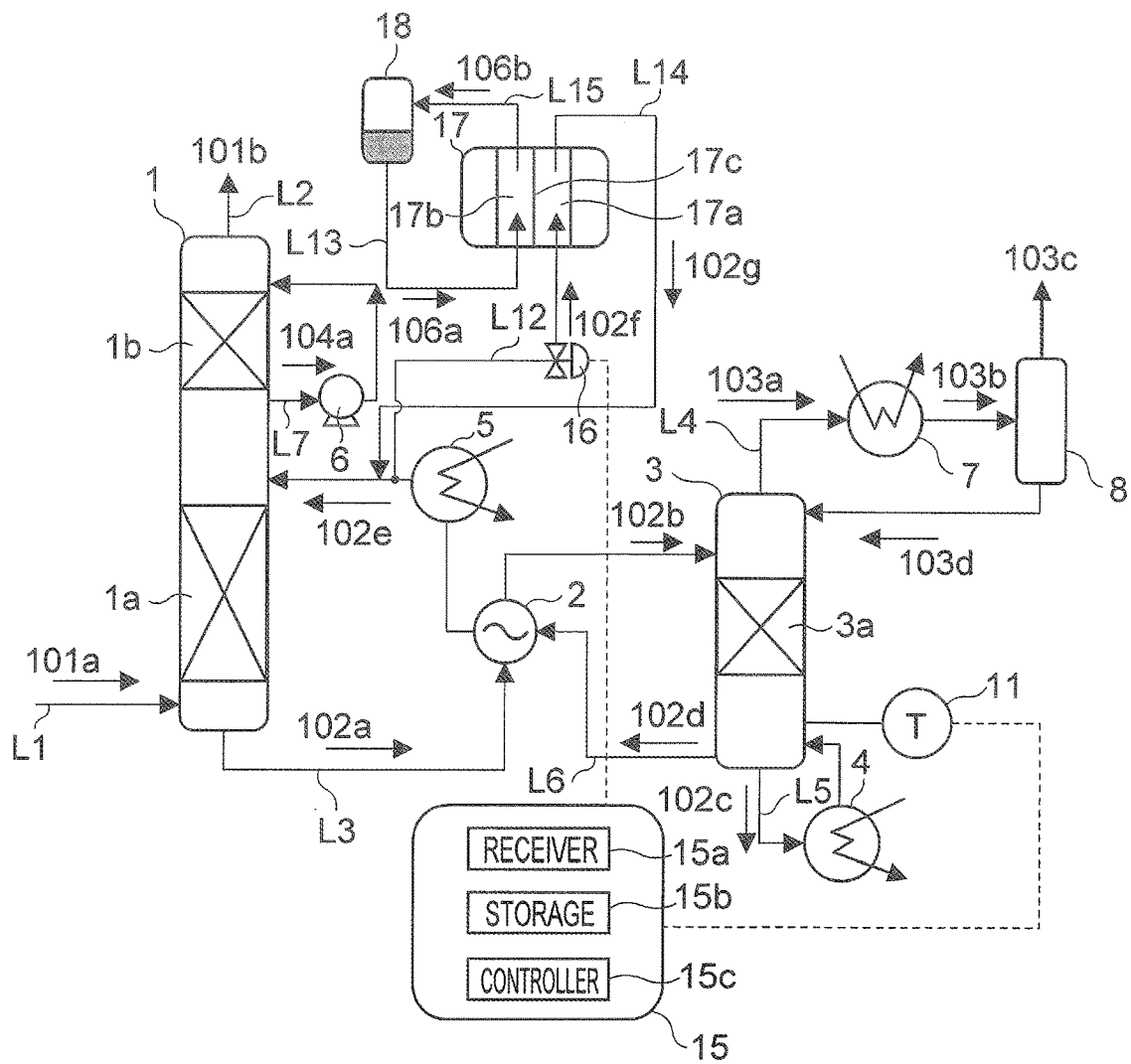
FIG. 3 is a schematic view showing a configuration of an acid gas removing apparatus of a second embodiment.

FIG. 3 is a schematic view showing a configuration of an acid gas removing apparatus of a second embodiment.

The acid gas removing apparatus in FIG. 3 has a configuration similar to that of the acid gas removing apparatus in FIG. 1, but includes a valve 16, an electrodialyzer 17, and an acid recovery solution supplier 18 instead of the resupplied solution tank 12, the resupplied solution pump 13, and the valve 14. The electrodialyzer 17 includes at least one each of an absorbent purifying chamber 17a, an acid recovering chamber 17b, and an anion exchange membrane 17c. The valve 16, the electrodialyzer 17, and the acid recovery solution supplier 18 are examples of an acid component remover, and the valve 16 is an example of a second valve.

The valve 16, the electrodialyzer 17, and the acid recovery solution supplier 18 may be replaced by other means. Examples of such means include distillation, vacuum distillation, ion-exchange resin, and membrane separation. The following description will be given using electrodialysis as an example.

The acid gas removing apparatus in FIG. 3 further has lines similar to those of the acid gas removing apparatus in FIG. 1, but includes a lean solution line L12, an acid recovery solution line L13, a lean solution line L14, and an acid recovery solution line L15 instead of the resupplied solution line L11.

The lean solution line L12 extends from the lean solution line L6 to the electrodialyzer 17 via the valve 16. The lean solution line L14 extends from the electrodialyzer 17 to the lean solution line L6. FIG. 3 shows a lean solution 102f flowing in the lean solution line L12, and a lean solution 102g flowing in the lean solution line L14. The lean solution line L12 and the lean solution line L14 in the present embodiment are coupled to the lean solution line L6 at points between the cooler 5 and the absorption tower 1. However, the coupling point between the lean solution line L14 and the lean solution line L6 is positioned downstream of the coupling point between the lean solution line L12 and the lean solution line L6. The lean solution line L12 is an example of a second flow path, and the lean solution line L6 is an example of a third flow path.

On the other hand, the acid recovery solution line L13 extends from the acid recovery solution supplier 18 to the electrodialyzer 17. The acid recovery solution line L15 extends from the electrodialyzer 17 to the acid recovery solution supplier 18. FIG. 3 shows an acid recovery solution 106a flowing in the acid recovery solution line L13, and an acid recovery solution 106b flowing in the acid recovery solution line L15.

The valve 16 is provided on the lean solution line L12. The lean solution line L12 couples the lean solution line L6 and the electrodialyzer 17 as shown in FIG. 3, and supplies at least part of the lean solution 102e flowing in the lean solution line L6 to the electrodialyzer 17 as the lean solution 102f. The valve 16 is used to control delivery of the lean solution 102f from the lean solution line L6 to the electrodialyzer 17. For example, in a case of starting removal of the acid component, the valve 16 is opened, and in a case of stopping removal of the acid component, the valve 16 is closed.

The electrodialyzer 17 removes the acid component from the lean solution 102f by electrodialysis. Specifically, the electrodialyzer 17 in the present embodiment removes the acid component from the lean solution 102f by recovering the acid component from the lean solution 102f into the acid recovery solution 106a. The lean solution 102f from which the acid component has been removed is discharged as the lean solution 102g from the electrodialyzer 17 to the lean solution line L14, and returned from the lean solution line L14 to the lean solution line L6. On the other hand, the acid recovery solution 106a having recovered the acid component is discharged as the acid recovery solution 106b from the electrodialyzer 17 to the acid recovery solution line L15. The acid component targeted for recovery is the above-described heat stable amine salt ($R_3NHX$), for example, and is $X^-$ in $R_3NHX$ in more detail. In this case, an aqueous solution containing the heat stable amine salt ($R_3NHX$), for example, is used as the acid recovery solution 106a.

The electrodialyzer 17 includes the absorbent purifying chamber 17a and the acid recovering chamber 17b between a cathode not shown and an anode not shown. The anion exchange membrane 17c is provided between the absorbent purifying chamber 17a and the acid recovering chamber 17b. The electrodialyzer 17 is used in a state where a voltage is applied across the above-described cathode and the above-described anode.

The lean solution 102f is introduced into the absorbent purifying chamber 17a. In the absorbent purifying chamber 17a, $R_3NHX$ in the lean solution 102f is ionized into $R_3NH^+$ and $X^-$. $X^-$ in the absorbent purifying chamber 17a passes through the anion exchange membrane 17c by being attracted to the anode, and moves into the acid recovering chamber 17b.

The acid recovery solution 106a is introduced into the acid recovering chamber 17b, and recovers $X^-$ having entered.

The lean solution 102f is discharged as the lean solution 102g from the absorbent purifying chamber 17a. The lean solution 102g contains a lower concentration of $X^-$ than the lean solution 102f. This can be expressed that $R_3NHX$ decreases and $R_3N$ increases when the lean solution 102f turns into the lean solution 102g. In this manner, the electrodialyzer 17 can remove $X^-$ (acid component) from the lean solution 102f.

The acid recovery solution 106a is discharged as the acid recovery solution 106b from the acid recovering chamber 17b. The acid recovery solution 106b has a higher concentration of $X^-$ than the acid recovery solution 106a. In this manner, the electrodialyzer 17 can recover $X^-$ (acid component) in the lean solution 102f into the acid recovery solution 106a.

The acid recovery solution supplier 18 supplies the acid recovery solution 106a to the electrodialyzer 17 via the acid recovery solution line L13. The acid recovery solution 106a is a liquid having electric conductivity that enables electrodialysis, for example, and may be pure water, but desirably contains in advance a small amount of acid, alkali, salt, or the like. Examples of such an acid include sulfur, nitric acid, formic acid, and acetic acid. The acid recovery solution 106a used in the electrodialyzer 17 is discharged as the acid recovery solution 106b to the acid recovery solution line L15, and returned to the acid recovery solution supplier 18 from the acid recovery solution line L15.

The control apparatus 15 controls various operations of the acid gas removing apparatus similarly to the case of the first embodiment. The control apparatus 15 monitors a signal from the thermometer 11, and controls opening/closing and an opening degree of the valve 16, for example.

The receiver 15a receives a signal including a measurement result of the temperature of the absorbent in the regeneration tower 3 from the thermometer 11. The receiver 15a in the present embodiment receives data on the regeneration tower bottom temperature measured by the thermometer 11, for example, similarly to the case of the first embodiment.

The storage 15b is used to store various types of data for controlling the operation of the acid gas removing apparatus. The storage 15b in the present embodiment stores the set temperatures Tb1 and Tb2 which will be described later, for example (see FIG. 4).

The controller 15c controls removal of the acid component from the absorbent in the acid gas removing apparatus based on the temperature received by the receiver 15a. For example, when removing the acid component from the absorbent in the acid gas removing apparatus, the controller 15c opens the valve 16 on the lean solution line L12 to activate the electrodialyzer 17. This allows the lean solution 102f to be introduced into the electrodialyzer 17 from the lean solution line L6 via the lean solution line L12, and the acid component is removed from the lean solution 102f by the electrodialyzer 17.

Figure 4:
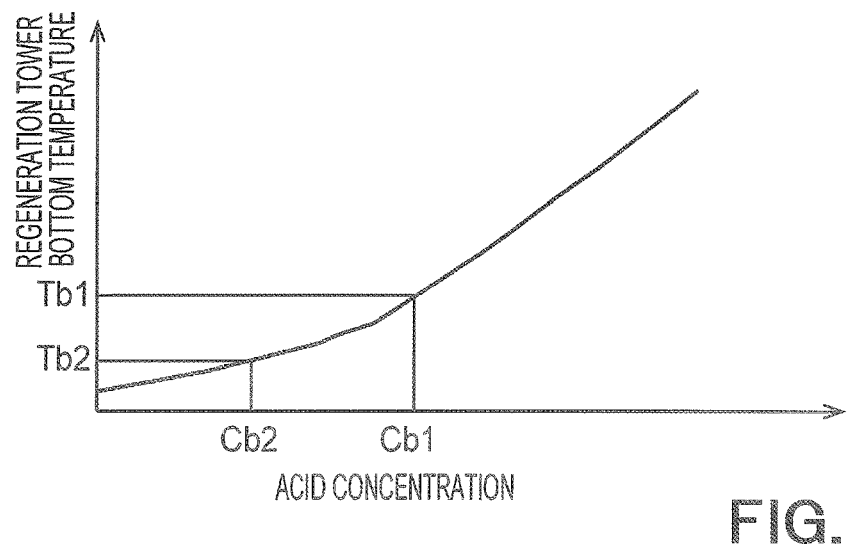
FIG. 4 is a graph showing a relation between acid concentration and regeneration tower bottom temperature of the second embodiment.

FIG. 4 is a graph showing a relation between the acid concentration and regeneration tower bottom temperature in the second embodiment.

In the graph in FIG. 4, the horizontal axis indicates the acid concentration (acid component concentration) in the lean solution retained at the bottom of the regeneration tower 3, and the vertical axis indicates the temperature (regeneration tower bottom temperature) of the lean solution retained at the bottom of the regeneration tower 3. FIG. 4 shows a relation between the acid concentration and regeneration tower bottom temperature in a case where the flow amount of vapor to be used for heat exchange in the reboiler 4 is constant. As shown in FIG. 4, when the acid concentration in the lean solution increases, the regeneration tower bottom temperature rises.

As described above, when the acid component accumulates in the absorbent and the acid concentration in the absorbent increases, $CO_2$ recovery performance of the absorbent degrades. This makes it desirable to remove the acid component from the absorbent. However, when the amount of acid accumulated in the absorbent shall be periodically analyzed in order to sense that the acid component in the absorbent has increased, a large burden will be imposed on the operation of the acid gas removing apparatus.

The acid gas removing apparatus in the present embodiment removes the acid component from the absorbent utilizing the relation shown in FIG. 4. For example, in a case where the regeneration tower bottom temperature is high, the controller 15c determines that the acid concentration in the absorbent is high, and removes the acid component from the absorbent. On the other hand, in a case where the regeneration tower bottom temperature is low, the controller 15c determines that the acid concentration in the absorbent is low, and do not remove the acid component from the absorbent. The present embodiment makes it possible to determine a time when the acid component is to be removed from the absorbent by measuring the temperature of the absorbent instead of analyzing the amount of acid accumulated in the absorbent.

In order to exert such control, the present embodiment uses the set temperatures Tb1 and Tb2 shown in FIG. 4. The set temperature Tb1 is the regeneration tower bottom temperature in a case where the acid concentration is Cb1, and the set temperature Tb2 is the regeneration tower bottom temperature in a case where the acid concentration is Cb2. The set temperature Tb1 is used as a threshold value for starting removal of the acid component. The set temperature Tb2 is used as a threshold value for terminating removal of the acid component. In the present embodiment, the set temperature Tb2 is lower than the set temperature Tb1 (Tb2<Tb1), and the acid concentration Cb2 is lower than the acid concentration Cb1 (Cb2<Cb1). The set temperature Tb1 is an example of a first set temperature. The set temperature Tb2 is an example of a second set temperature.

Next, the operation of the acid gas removing apparatus in the present embodiment will be described with reference to FIG. 3 again.

In a case where the temperature (received temperature) received by the receiver 15a rises to the set temperature Tb1, the controller 15c opens the valve 16 to activate the electrodialyzer 17. This allows removal of the acid component to be started, and the acid concentration in the absorbent in the acid gas removing apparatus decreases.

The control apparatus 15c keeps the valve 16 open while the received temperature is higher than the set temperature Tb1, and continues removing the acid component. On the other hand, the control apparatus 15c does not close the valve 16 even if the received temperature drops to the set temperature Tb1. The control apparatus 15c closes the valve 16 when the received temperature drops to the set temperature Tb2. This allows removal of the acid component to be terminated.

By setting the set temperature Tb2 (a threshold value for terminating removal) to be lower than the set temperature Tb1 (a threshold value for starting removal), the present embodiment makes it possible to prevent opening/closing of the valve 16 from being repeated in a short period in a case where the received temperature oscillates around the set temperature Tb1. The set temperatures Tb1 and Tb2 are 100° C. to 150° C., for example. Moreover, the difference (Tb1−Tb2) between the set temperature Tb1 and the set temperature Tb2 is 1° C. to 20° C., for example.

The control apparatus 15c keeps the valve 16 closed while the received temperature is lower than the set temperature Tb2, and keeps stopping removal of the acid component. On the other hand, the control apparatus 15c does not open the valve 16 even if the received temperature rises to the set temperature Tb2. The control apparatus 15c opens the valve 16 again when the received temperature rises to the set temperature Tb1 to activate the electrodialyzer 17. This allows removal of the acid component to be started again, and the acid concentration in the absorbent in the acid gas removing apparatus decreases. In the present embodiment, start and termination of removal of the acid component are repeated alternately.

Next, various variations of the operation of the acid gas removing apparatus in the present embodiment will be described.

The present embodiment also makes it possible to control removal of the acid component based on the flow amount of vapor to be used for heat exchange in the reboiler 4 instead of being based on the regeneration tower bottom temperature. In this case, the thermometer 11 is replaced by a flow meter. However, the temperature of the absorbent is easier to manage than the flow amount of vapor by preventing the temperature of the absorbent from becoming high. This makes it more desirable to control removal of the acid component based on the regeneration tower bottom temperature.

In the present embodiment, the set temperature Tb1 may be used as a threshold value both for start of removal and termination of removal. For example, in a case where the received temperature is unlikely to oscillate around the set temperature Tb1, only the set temperature Tb1 may be used as the threshold value. On the other hand, in a case where the received temperature is highly likely to oscillate around the set temperature Tb1, it is desirable to use both the set temperatures Tb1 and Tb2 as threshold values.

The acid component remover including the electrodialyzer 17 and the acid recovery solution supplier 18 may be replaced by another means that removes the acid component from the absorbent. Examples of such means include distillation, vacuum distillation, ion-exchange resin, and membrane separation.

The electrodialyzer 17 may capture an absorbent other than the lean solution 102e on the lean solution line L6. The electrodialyzer 17 may capture the rich solution 102a, 102b or the lean solution 102c, 102d, 102e in the absorption tower 1, in the regeneration tower 3, on the rich solution line L3, on the lean solution line L5, or on the lean solution line L6, for example. However, since it is desirable that the absorbent captured by the electrodialyzer 17 or ion-exchange resin have a low temperature, it is desirable that the absorbent in this case be the rich solution 102a or the lean solution 102e. In a case of comparing the rich solution 102a and the lean solution 102e, $CO_2$ in the rich solution 102a interferes with acid removal, which makes it more desirable to use the lean solution 102e than to use the rich solution 102a. Moreover, the lean solution 102e downstream of the cooler 5 has a temperature lower than the temperature of the lean solution 102e upstream of the cooler 5, which makes it desirable to use the lean solution 102e downstream of the cooler 5.

Moreover, when removing the acid component, the amounts of the lean solution 102f and the acid recovery solution 106a to be supplied to the electrodialyzer 17, as well as a time for removing the acid component can be set freely. For example, in a case where the received temperature rises to the set temperature Tb1, and removal of the acid component is started, the controller 15c may terminate removal of the acid component when a predetermined time elapses after removal of the acid component instead of terminating removal of the acid component when the received temperature drops to the set temperature Tb2. It is further preferable to set a predetermined waiting time after removal of the acid component is completed. Whether the regeneration tower bottom temperature after the lapse of the predetermined waiting time has reached the set temperature Tb2 is measured. If a temperature higher than Tb2 continues, an influence caused by a sudden variation in the regeneration tower bottom temperature associated with removal of the acid component can be reduced by further carrying out removal of the acid component.

Moreover, the controller 15c may control removal of the acid component based on an instantaneous value of regeneration tower bottom temperature, or may control removal of the acid component based on an average value of the regeneration tower bottom temperature. The former case makes it possible to reflect an instantaneous change in the regeneration tower bottom temperature in removal of the acid component. The latter case makes it possible to ignore a change in the regeneration tower bottom temperature in a short time as an error. Since the regeneration tower bottom temperature may also vary under the influence of a variation in the $CO_2$ concentration in the flue gas 101a, or the like, it is preferable to use an average value in a case where the variation range is wide. The above-described average value is an average value of the regeneration tower bottom temperature per hour to per day, for example.

Moreover, the set temperatures Tb1 and Tb2 can be set freely. It is desirable to set the set temperature Tb1 to be lower than a saturation temperature of water at a full pressure in the regeneration tower 3, for example. This makes it possible to start removing the acid component before the absorbent reaches the saturation temperature, and the temperature of the absorbent can be prevented from becoming high.

Moreover, the set temperature Tb1 in the present embodiment may be the same temperature as or a temperature different from the set temperature Ta1 in the first embodiment. However, since a preferable upper limit temperature of the regeneration tower bottom temperature is considered the same in many cases both in the first embodiment and in the present embodiment, the set temperature Tb1 desirably is the same temperature as the set temperature Ta1.

Moreover, the set temperature Tb2 in the present embodiment may be the same temperature as or a temperature different from the set temperature Ta2 in the first embodiment. For example, in a case of intending to set a margin temperature "Tb1−Tb2" in the present embodiment at a temperature different from the margin temperature "Ta1−Ta2" in the first embodiment, the set temperature Tb1 may be set at the same temperature as the set temperature Ta1, and the set temperature Tb2 may be set at a temperature different from the set temperature Ta2.

As described above, the controller 15c in the present embodiment controls removal of the acid component from the absorbent based on the temperature of the absorbent measured by the thermometer 11. This makes it possible to suitably remove the acid component from the absorbent in the present embodiment. For example, a time when the acid component is to be removed from the absorbent can be determined by measuring the temperature of the absorbent instead of analyzing the content of the acid component in the absorbent.

Third Embodiment

Figure 5:
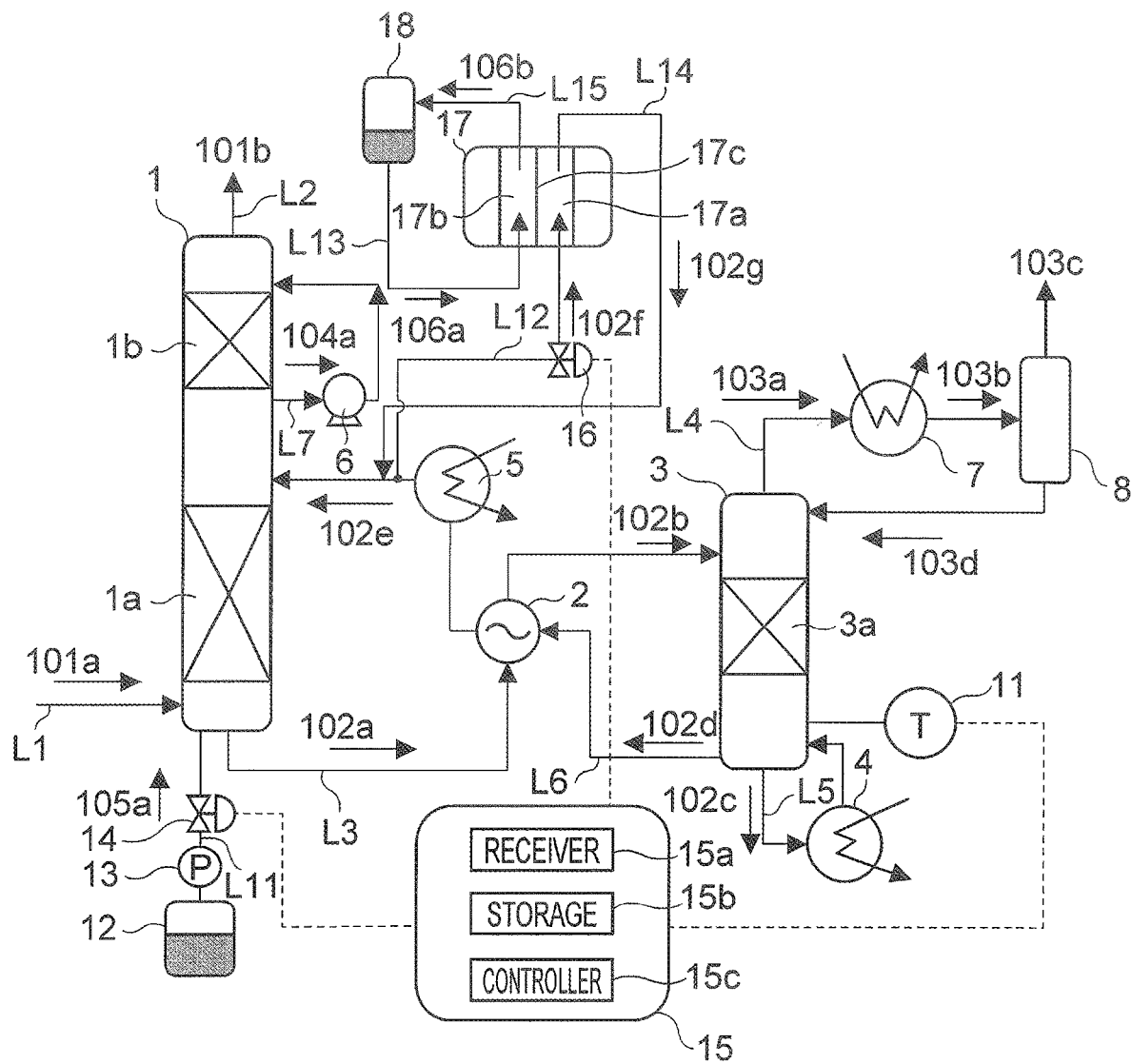
FIG. 5 is a schematic view showing a configuration of an acid gas removing apparatus of a third embodiment.

FIG. 5 is a schematic view showing a configuration of an acid gas removing apparatus of a third embodiment.

The acid gas removing apparatus in FIG. 5 includes the absorption tower 1, the heat exchanger 2, the regeneration tower 3, the reboiler 4, the cooler 5, the circulating pump 6, the cooler 7, the gas-liquid separator 8, the thermometer 11, the resupplied solution tank 12, the resupplied solution pump 13, the valve 14, the control apparatus 15, the valve 16, the electrodialyzer 17, and the acid recovery solution supplier 18. In this manner, the acid gas removing apparatus in FIG. 5 includes both the components shown in FIG. 1 and the components shown in FIG. 3.

Hereinafter, an operation of the control apparatus 15 in the present embodiment will be described.

The control apparatus 15 controls various operations of the acid gas removing apparatus similarly to the cases of the first and second embodiments. The control apparatus 15 monitors a signal from the thermometer 11, and controls opening/closing and opening degrees of the valves 14 and 16, for example.

The receiver 15a receives a signal including a measurement result of the temperature of the absorbent in the regeneration tower 3 from the thermometer 11. The receiver 15a in the present embodiment receives data on the regeneration tower bottom temperature measured by the thermometer 11, for example, similarly to the cases of the first and second embodiments.

The storage 15b is used to store various types of data for controlling the operation of the acid gas removing apparatus. The storage 15b in the present embodiment stores the aforementioned set temperatures Ta1, Ta2, Tb1, and Tb2 (see FIG. 2 and FIG. 4), for example. The set temperature Ta1 and the set temperature Tb1 may be the same temperature or different temperatures. The set temperature Ta2 and the set temperature Tb2 may also be the same temperature or different temperatures. In the following description in the present embodiment, the set temperature Ta1 and the set temperature Tb1 shall be the same temperature (Ta1=Tb1), and the set temperature Ta2 and the set temperature Tb2 shall also be the same temperature (Ta2=Tb2).

The controller 15c controls resupply of the resupplied solution 105a to the absorbent in the acid gas removing apparatus and removal of an acid component from the absorbent in the acid gas removing apparatus based on the temperature received by the receiver 15a. For example, when resupplying the resupplied solution 105a to the absorbent in the acid gas removing apparatus, the controller 15c opens the valve 14 on the resupplied solution line L11. This allows the resupplied solution 105a to be introduced into the absorption tower 1 from the resupplied solution tank 12 via the resupplied solution line L11, and the resupplied solution 105a is resupplied to the rich solution 102a at the bottom of the absorption tower 1. Moreover, when removing an acid component from the absorbent in the acid gas removing apparatus, the controller 15c opens the valve 16 on the lean solution line L12. This allows the lean solution 102f to be introduced into the electrodialyzer 17 from the lean solution line L6 via the lean solution line L12, and the acid component is removed from the lean solution 102f by the electrodialyzer 17.

Next, an operation of the acid gas removing apparatus in the present embodiment will be described with continuous reference to FIG. 5.

The controller 15c opens the valves 14 and 16 in a case where the temperature (received temperature) received by the receiver 15a rises to the set temperature Ta1 (=Tb1). This allows resupply of the resupplied solution 105a to be started, and the amine concentration in the absorbent in the acid gas removing apparatus increases. Furthermore, removal of the acid component is started, and the acid concentration in the absorbent in the acid gas removing apparatus decreases.

When opening the valves 14 and 16 as described above, the valves 14 and 16 may be opened simultaneously, or may be opened in a predetermined order. For example, in a case where the received temperature rises to the set temperature Ta1, the valve 14 may be opened first, and the valve 16 may be opened next. In this case, setting data for setting the order of opening the valves 14 and 16 may be stored in the storage 15b in advance.

The control apparatus 15c keeps the valves 14 and 16 open while the received temperature is higher than the set temperature Ta1 to continue resupply of the resupplied solution 105a and removal of the acid component. On the other hand, the control apparatus 15c does not close the valves 14 and 16 even if the received temperature drops to the set temperature Ta1. The control apparatus 15c closes the valves 14 and 16 when the received temperature drops to the set temperature Ta2 (=Tb2). This allows resupply of the resupplied solution 105a and removal of the acid component to be terminated.

When closing the valves 14 and 16 as described above, the valves 14 and 16 may be closed simultaneously, or may be opened in a predetermined order. For example, in the case where the received temperature drops to the set temperature Ta2, the valve 14 may be closed first, and the valve 16 may be closed next. In this case, setting data for setting the order of closing the valves 14 and 16 may be stored in the storage 15b in advance.

By setting the set temperature Ta2 (a threshold value for termination of resupply and termination of removal) to be lower than the set temperature Ta1 (a threshold value for start of resupply and start of removal), the present embodiment makes it possible to prevent opening/closing of the valves 14 and 16 from being repeated in a short period in a case where the received temperature oscillates around the set temperature Ta1. The set temperatures Ta1 and Ta2 are 100° C. to 150° C., for example. Moreover, the difference (Ta1−Ta2) between the set temperature Ta1 and the set temperature Ta2 is 1° C. to 20° C., for example.

The control apparatus 15c keeps the valves 14 and 16 closed while the received temperature is lower than the set temperature Ta2 to keep stopping resupply of the resupplied solution 105a and removal of the acid component. On the other hand, the control apparatus 15c does not open the valves 14 and 16 even if the received temperature rises to the set temperature Ta2. The control apparatus 15c opens the valves 14 and 16 again if the received temperature rises to the set temperature Ta1. This allows resupply of the resupplied solution 105a to be started again, and the amine concentration in the absorbent in the acid gas removing apparatus increases. Furthermore, removal of the acid component is started again, and the acid concentration in the absorbent in the acid gas removing apparatus decreases. In the present embodiment, start and termination of resupply of the resupplied solution 105a are repeated alternately, and start and termination of removal of the acid component are repeated alternately.

Various modifications of the operation of the acid gas removing apparatus in the first embodiment and various modifications of the operation of the acid gas removing apparatus in the second embodiment are also applicable to the operation of the acid gas removing apparatus in the present embodiment. Hereinafter, further modifications of the operation of the acid gas removing apparatus in the present embodiment will be described.

In general, decrease of an absorbent component and increase of an acid component in the acid gas removing apparatus occur simultaneously. This may make it impossible to prevent the regeneration tower bottom temperature from rising if only one of resupply of the resupplied solution 105a and removal of the acid component is performed. By performing both resupply of the resupplied solution 105a and removal of the acid component in a case where the received temperature is higher than the set temperature Ta1, the present embodiment makes it possible to effectively prevent the regeneration tower bottom temperature from rising.

The control apparatus 15c may open the valves 14 and 16 alternately while the received temperature is higher than the set temperature Ta1, instead of keeping the valves 14 and 16 open. For example, the control apparatus 15c may alternately and repeatedly perform first processing of opening the valve 14 and closing the valve 16 and second processing of closing the valve 14 and opening the valve 16. This allows resupply of the resupplied solution 105a and removal of the acid component to be performed alternately and repeatedly.

Moreover, in a case of opening the valves 14 and 16 successively, the valves 14 and 16 may be opened at any timing. For example, the valve 14 may be opened at a time when a rise of the received temperature to the set temperature Ta1 is detected, and the valve 16 may be opened at a time when it is detected that the received temperature does not drop to the set temperature Ta2 even if a predetermined amount is resupplied or a predetermined time elapses thereafter. This makes it possible to effectively lower the regeneration tower bottom temperature. Similarly, in a case of closing the valves 14 and 16 successively, the valves 14 and 16 may be closed at any timing.

Alternatively, the control apparatus 15c may alternately and repeatedly perform first processing of only opening the valve 14 when the received temperature becomes higher than the set temperature Ta1 to perform resupply and closing the valve 14 when the received temperature reaches the set temperature Ta2, and then second processing of only opening the valve 16 when the received temperature becomes higher than the set temperature Tb1 to remove the acid component, and closing the valve 16 when the received temperature reaches the set temperature Tb2. Still alternatively, rather than performing the first processing and the first processing alternately, the frequency or repetitive pattern of the first processing and the second processing may be changed to: first processing→second processing→second processing→first processing→second processing→second processing, in accordance with operation performance of a plant. This makes it possible to more effectively lower the regeneration tower bottom temperature. In this case, setting data on the order of the first processing and the second processing may be stored in the storage 15b in advance.

As described above, the controller 15c in the present embodiment controls resupply of the resupplied solution 105a to the absorbent and removal of the acid component from the absorbent based on the temperature of the absorbent measured by the thermometer 11. This makes it possible to suitably perform resupply of the resupplied solution 105a to the absorbent and removal of the acid component from the absorbent in the present embodiment. For example, measuring the temperature of the absorbent instead of analyzing the content of the absorbent component or the acid component in the absorbent makes it possible to determine a time when the resupplied solution 105a is to be resupplied to the absorbent and a time when the acid component is to be removed from the absorbent.

The acid gas removing apparatuses in the first to third embodiments may be apparatuses that remove acid gas other than $CO_2$ from treatment-target gas. Examples of such acid gas include $SO_N$, $NO_N$, and $H_2S$. Moreover, the treatment-target gas may be gas other than flue gas.

While certain embodiments have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from the spirit of the inventions. The accompanying claims and their equivalents are intended to cover such forms or modifications as would fall within the scope and spirit of the inventions.

The invention claimed is:

1. An acid gas removal control apparatus that controls an acid gas removing apparatus comprising:
   an absorber configured to bring a first gas including carbon dioxide as an acid gas and a lean solution into contact to discharge a rich solution that is the lean solution having absorbed the carbon dioxide, and a second gas including the first gas from which the carbon dioxide has been removed;
   a regenerator configured to separate the carbon dioxide from the rich solution discharged by the absorber to discharge the lean solution that is the rich solution separated from the carbon dioxide, and a third gas including the carbon dioxide separated from the rich solution; and
   a measuring instrument configured to measure a temperature of the rich solution or the lean solution in the regenerator,
   the acid gas removal control apparatus comprising:
   a receiver configured to receive the temperature measured by the measuring instrument; and
   a controller configured to control removal of an acid component from the rich solution or the lean solution, based on the temperature received by the receiver,
   wherein the controller is configured to:
   start the removal of the acid component in a case where the temperature received by the receiver rises to a first set temperature,
   continue the removal of the acid component in a case where the temperature received by the receiver is higher than the first set temperature, and
   terminate the removal of the acid component in a case where the temperature received by the receiver drops to a second set temperature that is lower than the first set temperature,
   a difference between the first set temperature and the second set temperature being 1° C. to 20° C.

2. The acid gas removal control apparatus of claim 1, wherein the first set temperature is lower than a saturation temperature of water at a full pressure in the regenerator.

3. The acid gas removal control apparatus of claim 1, wherein
   the acid gas removing apparatus further comprises an acid component remover configured to remove the acid component from the rich solution or the lean solution, and
   the controller controls removal of the acid component by the acid component remover, based on the temperature received by the receiver.

4. The acid gas removal control apparatus of claim 1, wherein
   the acid gas removing apparatus further comprises
   a resupplier configured to resupply a resupplied solution to the rich solution or the lean solution, and
   an acid component remover configured to remove the acid component from the rich solution or the lean solution, and
   the controller controls resupply of the resupplied solution by the resupplier and removal of the acid component by the acid component remover, based on the temperature received by the receiver.

5. The acid gas removal control apparatus of claim 4, wherein
   the resupplier includes a first valve provided on a first flow path that resupplies the resupplied solution to the rich solution or the lean solution, and
   the controller controls the first valve to control resupply of the resupplied solution by the resupplier.

6. The acid gas removal control apparatus of claim 5, wherein
the absorber includes a gas-liquid contact portion in which the first gas and the lean solution are brought into contact, and
the first flow path introduces the resupplied solution into a space under the gas-liquid contact portion in the absorber to resupply the resupplied solution to the rich solution in the absorber.

7. The acid gas removal control apparatus of claim 3, wherein
the acid component remover includes a second valve provided on a second flow path that supplies the rich solution or the lean solution to the acid component remover, and
the controller controls the second valve to control removal of the acid component by the acid component remover.

8. The acid gas removal control apparatus of claim 7, wherein the second flow path supplies the acid component remover with the lean solution flowing in a third flow path directed from the regenerator to the absorber.

9. An acid gas removal control method for controlling an acid gas removing apparatus comprising:
an absorber configured to bring a first gas including carbon dioxide as an acid gas and a lean solution into contact to discharge a rich solution that is the lean solution having absorbed the carbon dioxide, and a second gas including the first gas from which the carbon dioxide has been removed;
a regenerator configured to separate the carbon dioxide from the rich solution discharged by the absorber to discharge the lean solution that is the rich solution separated from the carbon dioxide, and a third gas including the carbon dioxide separated from the rich solution; and
a measuring instrument configured to measure a temperature of the rich solution or the lean solution in the regenerator,
the acid gas removal control method comprising:
receiving, by a receiver, the temperature measured by the measuring instrument; and
controlling, by a controller, removal of an acid component from the rich solution or the lean solution, based on the temperature received by the receiver,
wherein the acid gas removal control method further comprising:
starting, by the controller, the removal of the acid component in a case where the temperature received by the receiver rises to a first set temperature;
continuing, by the controller, the removal of the acid component in a case where the temperature received by the receiver is higher than the first set temperature; and
terminating, by the controller, the removal of the acid component in a case where the temperature received by the receiver drops to a second set temperature that is lower than the first set temperature,
a difference between the first set temperature and the second set temperature being 1° C. to 20° C.

10. An acid gas removing apparatus comprising:
an absorber configured to bring a first gas including carbon dioxide as an acid gas and a lean solution into contact to discharge a rich solution that is the lean solution having absorbed the carbon dioxide, and a second gas including the first gas from which the carbon dioxide has been removed;
a regenerator configured to separate the carbon dioxide from the rich solution discharged by the absorber to discharge the lean solution that is the rich solution separated from the carbon dioxide, and a third gas including the carbon dioxide separated from the rich solution;
a measuring instrument configured to measure a temperature of the rich solution or the lean solution in the regenerator; and
a controller configured to control removal of an acid component from the rich solution or the lean solution, based on the temperature measured by the measuring instrument,
wherein the controller is configured to:
start the removal of the acid component in a case where the temperature measured by the measuring instrument rises to a first set temperature;
continue the removal of the acid component in a case where the temperature measured by the measuring instrument is higher than the first set temperature; and
terminate the removal of the acid component in a case where the temperature measured by the measuring instrument drops to a second set temperature that is lower than the first set temperature,
a difference between the first set temperature and the second set temperature being 1° C. to 20° C.

11. An acid gas removal control apparatus that controls an acid gas removing apparatus comprising:
an absorber configured to bring a first gas including carbon dioxide as an acid gas and a lean solution into contact to discharge a rich solution that is the lean solution having absorbed the carbon dioxide, and a second gas including the first gas from which the carbon dioxide has been removed;
a regenerator configured to separate the carbon dioxide from the rich solution discharged by the absorber to discharge the lean solution that is the rich solution separated from the carbon dioxide, and a third gas including the carbon dioxide separated from the rich solution, and
a measuring instrument configured to measure a temperature of the rich solution or the lean solution in the regenerator,
the acid gas removal control apparatus comprising:
a receiver configured to receive the temperature measured by the measuring instrument; and
a controller configured to control resupply of a resupplied solution to the rich solution or the lean solution, based on the temperature received by the receiver,
wherein the controller is configured to:
start the resupply of the resupplied solution in a case where the temperature received by the receiver rises to a first set temperature;
continue the resupply of the resupplied solution in a case where the temperature received by the receiver is higher than the first set temperature; and
terminate the resupply of the resupplied solution in a case where the temperature received by the receiver drops to a second set temperature that is lower than the first set temperature,
a difference between the first set temperature and the second set temperature being 1° C. to 20° C.

12. The acid gas removal control apparatus of claim 11, wherein
the acid gas removing apparatus further comprises a resupplier configured to resupply the resupplied solution to the rich solution or the lean solution, and the controller controls resupply of the resupplied solution by the resupplier, based on the temperature received by the receiver.

13. An acid gas removal control method for controlling an acid gas removing apparatus comprising:
   an absorber configured to bring a first gas including carbon dioxide as an acid gas and a lean solution into contact to discharge a rich solution that is the lean solution having absorbed the carbon dioxide, and a second gas including the first gas from which the carbon dioxide has been removed;
   a regenerator configured to separate the carbon dioxide from the rich solution discharged by the absorber to discharge the lean solution that is the rich solution separated from the carbon dioxide, and a third gas including the carbon dioxide separated from the rich solution; and
   a measuring instrument configured to measure a temperature of the rich solution or the lean solution in the regenerator,
   the acid gas removal control method comprising:
      receiving, by a receiver, the temperature measured by the measuring instrument; and
      controlling, by a controller, resupply of a resupplied solution to the rich solution or the lean solution, based on the temperature received by the receiver,
      wherein the acid gas removal control method further comprising:
      starting, by the controller, the resupply of the resupplied solution in a case where the temperature received by the receiver rises to a first set temperature;
      continuing, by the controller, the resupply of the resupplied solution in a case where the temperature received by the receiver is higher than the first set temperature; and
      terminating, by the controller, the resupply of the resupplied solution in a case where the temperature received by the receiver drops to a second set temperature that is lower than the first set temperature,
   a difference between the first set temperature and the second set temperature being 1° C. to 20° C.

14. An acid gas removing apparatus comprising:
   an absorber configured to bring a first gas including carbon dioxide as an acid gas and a lean solution into contact to discharge a rich solution that is the lean solution having absorbed the carbon dioxide, and a second gas including the first gas from which the carbon dioxide has been removed;
   a regenerator configured to separate the carbon dioxide from the rich solution discharged by the absorber to discharge the lean solution that is the rich solution separated from the carbon dioxide, and a third gas including the carbon dioxide separated from the rich solution;
   a measuring instrument configured to measure a temperature of the rich solution or the lean solution in the regenerator; and
   a controller configured to control resupply of a resupplied solution to the rich solution, based on the temperature measured by the measuring instrument,
   wherein the controller is configured to:
      start the resupply of the resupplied solution in a case where the temperature measured by the measuring instrument rises to a first set temperature;
      continue the resupply of the resupplied solution, in a case where the temperature measured by the measuring instrument is higher than the first set temperature; and
      terminate the resupply of the resupplied solution, in a case where the temperature measured by the measuring instrument drops to a second set temperature that is lower than the first set temperature,
   a difference between the first set temperature and the second set temperature being 1° C. to 20° C.

* * * * *